Figure 1:
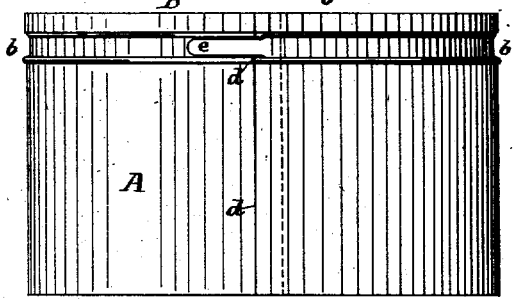

G. A. WAEBER.

Assignor to THE FRANCO-AMERICAN PATENT CAN OPENING COMPANY.

METAL CAN, BOX, OR OTHER RECEPTACLE.

No. 11,076. Reissued May 13, 1890.

WITNESSES:-
A. L. Guestis
M. B. Dodge.

INVENTOR:-
Gustavus A. Waeber,
By S. D. Coggeshall
his Attorney.

UNITED STATES PATENT OFFICE.

GUSTAVUS A. WAEBER, OF NEW YORK, N. Y., ASSIGNOR TO THE FRANCO-AMERICAN PATENT CAN OPENING COMPANY.

METAL CAN, BOX, OR OTHER RECEPTACLE.

SPECIFICATION forming part of Reissued Letters Patent No. 11,076, dated May 13, 1890.

Original No. 401,913, dated April 23, 1889. Application for reissue filed February 28, 1890. Serial No. 342,149.

*To all whom it may concern:*

Be it known that I, GUSTAVUS A. WAEBER, a citizen of the United States, residing in the city and county of New York, in the State of New York, have invented a new and useful Improvement in Metal Cans, Boxes, or other Receptacles, of which the following is a specification, reference being had to the accompanying drawings.

This invention relates to that class of metal cans and boxes which are opened by stripping off or tearing out a band or portion of the material of which the body or the cover of the can or box is composed. Two types of inventions of this nature have existed prior to my improvement. In the earlier of them the cover and the body of the can or other receptacle were in some cases made of the same diameter, and when they were to be hermetically sealed were brought together, so as to form a "butt-joint." In other cases the cover was made to inclose the upper part of the body in the usual way. A narrow strip of sheet metal was then placed over the joint between the cover and body, and one of its edges was soldered to the cover and the other edge to the body, one end of the strip after the joint was thus closed being allowed to project somewhat from the can, so as to form a tongue. When the can was to be opened, this tongue was gripped by a key or other suitable means, and the strip was torn away from the solder along its edges and the cover and body separated.

In the other and more recent type a circumferential incision extending partially through the metal and produced in it while in the flat state has been made in either the cover or the body of the can at a convenient distance from what was to be the open end of the one or the other, so that in the case of the cover the section of material below the incision and in the case of the body the section above it would become a narrow band or strip, and when the can was finished one end of this band was permitted to project slightly, thereby forming a tongue. These cans were sealed in the usual way by solder, the solder securing the edge of the band farthest from the incision, and when they were to be opened the tongue was gripped by hand or by a key or other suitable instrument, and the band or strip was torn out along the line of the solder at one of its edges and along the incision at its other edge, thus exposing the contents of the can. In one instance a can substantially of this type, but like a sardine-box, not of great height, has had the sheet of metal constituting its body weakened along two parallel lines, each at a short distance from the adjacent edge of the sheet and it has been proposed to open such a can by gripping with a key a short tapering extension or flap projecting outward from one end of the sheet and rolling the latter upon the key, thereby tearing the entire body of the can open along the weakened lines. The objections to cans of the first of these classes are that they are too expensive to be manufactured profitably, and that the soldered strip is liable not to part readily from the can and also break off in tearing, because great force often has to be applied to it to remove it. In cans of the second type no sufficient resistance is provided on one side of the line of incision to enable the strip on the other side to be always torn away successfully; nor is this mode of construction applicable to cans in which it is necessary or desirable that the cover should overlap the upper part of the body, as in the case of cans for packing salmon and many other purposes, and in which, consequently, the removable strip must be torn out of the can-body and not out of the cover.

My improvement differs from all these inventions; and it consists in the production at a suitable point in the body of a sheet-metal can, box, or other receptacle, or in its cover, of a narrow depression or sunken band extending entirely around the body or cover, and necessarily projecting as much on one side of the metal as it is depressed on the other, thereby forming moderately deep corners at each side or margin of the depressed band, and in making incisions of convenient depth in these corners or margins, so that as the corners serve, like corrugations, to greatly stiffen the portions of the metal which surround them, an ample resistance or fulcrum is provided in these surrounding portions to enable the depressed band to be readily and uniformly torn away from between them along the incisions. The band is made to terminate in a short outwardly-extending tongue adapted to be taken hold of by the hand or by any suitable instrument, and the band is then torn out in the usual way.

Figure 2:
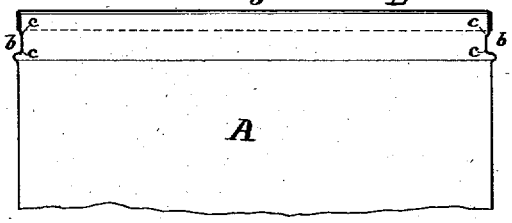
Figure 4:
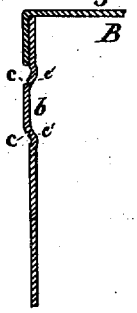
Figure 3:
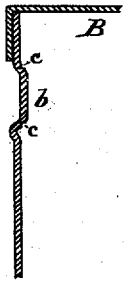
Figure 5:
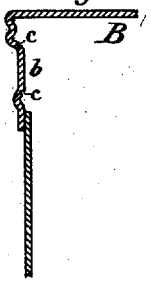

Figure 1 in the drawings is a side view of the upper part of a cylindrical-can or box, illustrating one example of my improvement. Fig. 2 is central vertical section corresponding with Fig. 1. Fig. 3 represents a section, on an enlarged scale, of that portion of the can or box which includes my invention. Fig. 4 represents a vertical section of part of one side of a can, illustrating another example of my invention. Fig. 5 is a similar view to Fig. 4, illustrating still another example.

Similar letters of reference designate corresponding parts in all the figures.

I will first describe the example shown in Figs. 1, 2, and 3.

A designates the side wall or body of the can or box, and B the head or cover thereof. The head or cover is represented as overlapping the said wall or body externally. At a suitable point below the head B there is produced in the wall or body A an external depression and a corresponding internal projection, thus forming a depressed band *b*. In the margins or corners of this band at *c c* there are incisions which may be made in the metal before it is made up into the can or box or after the can or box is made or partly made, the said incisions extending around the body or wall. The said incisions may be of a depth equal to, say, one-half or less of the thickness of the metal. The width of the depressed band between the incisions *c c* may be, say, about one-quarter of an inch. From the outer edge *d* of the joint of the wall or body A in line with the band *b* there is provided a projecting tongue *e*.

In the example illustrated by Fig. 4 the band *b* is depressed from the inside, and consequently its projection is outward instead of inward. In other respects this example is like that shown in Figs. 1, 2, and 3.

In the example shown in Fig. 5 the depressed or inwardly-projecting band is in the cover B; but in other respects this example is like that shown in Figs. 1, 2, and 3, and I wish it understood that I consider the cover for the can as constituting part of the can itself, and that the projecting band if formed on the cover would be within the scope of my invention.

To open the can or box the projecting tongue *e* is taken hold of by hand or any suitable instrument, and by pulling it a portion of the body or wall of the can or box is torn out in the form of a strip around the can or box, thereby separating the upper part of the can or box from the part below and allowing the said upper part to be removed to obtain access to the contents of the can or box.

The incisions *c c* may be in the inside or outside of the box or can and may be on the salient or re-entering angles of the corners of the band *b*—that is to say, at *c c* or at near the apices of the projecting parts of the corners, as at *c′ c′*. The action of these corners will be found highly important. They serve as ribs or slight corrugations to stiffen the metal above and below the incisions, and thereby furnish the necessary fulcrum or resistance against which the band can be readily and uniformly torn away.

It is obvious that my invention is as well applicable to cans or boxes of polygonal as other form.

What I claim as my invention, and desire to secure by Letters Patent, is—

A metal can, box, or receptacle having around the perimeter of its body or cover a depressed band with its corresponding projection, on the margins or corners of which are incisions, substantially as specified.

GUSTAVUS A. WAEBER.

Witnesses:

EDWARD C. VIESER,

F. G. HENRY.